(No Model.) 10 Sheets—Sheet 1.

W. A. LORENZ & W. H. HONISS.
PAPER BAG MACHINE.

No. 331,722. Patented Dec. 1, 1885.

Witnesses:
Albert H. Walker
Morgan W. Beach

Inventors:
William A. Lorenz
William H. Honiss.

N. PETERS, Photo-Lithographer, Washington, D. C.

(No Model.) 10 Sheets—Sheet 5.

W. A. LORENZ & W. H. HONISS.
PAPER BAG MACHINE.

No. 331,722. Patented Dec. 1, 1885.

Witnesses:
Albert H. Walker
Morgan W. Beach

Inventors:
William A. Lorenz.
William H. Honiss.

(No Model.) 10 Sheets—Sheet 9.
W. A. LORENZ & W. H. HONISS.
PAPER BAG MACHINE.
No. 331,722. Patented Dec. 1, 1885.

Fig 33.

Witnesses:
Edward E. Claussen
Henry T. Brück

Inventors:
William A. Lorenz
William H. Honiss

UNITED STATES PATENT OFFICE.

WILLIAM A. LORENZ AND WILLIAM H. HONISS, OF HARTFORD, CONNECTICUT, ASSIGNORS TO FELIX W. LEINBACH AND CLARENCE A. WOLLE, BOTH OF BETHLEHEM, PENNSYLVANIA.

PAPER-BAG MACHINE.

SPECIFICATION forming part of Letters Patent No. 331,722, dated December 1, 1885.

Application filed May 15, 1884. Serial No. 131,661. (No model.)

*To all whom it may concern:*

Be it known that we, WILLIAM A. LORENZ and WILLIAM H. HONISS, of Hartford, Connecticut, have jointly invented a certain new and useful Paper-Bag Machine, of which the following description and claims constitute the specification, and which is illustrated by the accompanying ten sheets of drawings.

This machine automatically manufactures square-bottomed paper bags from a continuous roll of paper, and is capable of working at a high rate of speed.

Similar figures refer to similar parts throughout the several views.

In order to explain the several operations required of this machine, we will first describe, by means of Figs. 1 to 8, inclusive, on Sheet 1, how the bag is constructed and how it appears when finished.

Figure 1:
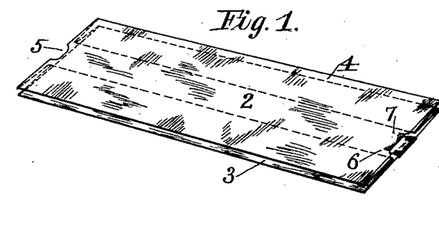
Figure 1, on Sheet 1 of the drawings, is a perspective view of a length of tucked-paper tube manufactured by this machine, and called by us a "blank.

The paper, having been drawn from a continuous roll, is passed over a former, and by mechanism to be hereinafter described it is shaped and pasted into a continuous tube, 2, Fig. 1, Sheet 1, having two inwardly-reaching tucks, 3 and 4. This tube 2 is passed through drawing and cutting rolls, and is severed by the latter to the required length, as shown in Fig. 1, which length is termed a "blank." This blank has a notch, 5, cut at one end, and slits 6 and 7, made in the other end, the notch 5 being for the purpose of conveniently opening the bag after completion, and the slits 6 and 7 to facilitate certain operations of folding.

Figure 2:
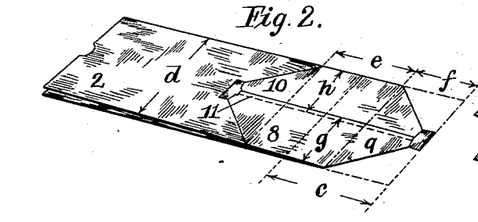
" Figs. 2 to 6, inclusive, on the same sheet, are perspective views of a series of transformations which the blank undergoes in being made by the machine into the completed bag shown in Fig. 6.

Fig. 2, Sheet 1, represents the blank 2, with one end folded into the diamond 8. The operation of folding this diamond 8 from a portion of the blank 2 equal to that indicated by $c$ is fully described hereinafter. The diamond 8 is, in reality, truncated, forming two pointed ends, 9 and 10, which we call "flaps." The length of the flaps, as indicated by $f$, is equal in length to that part of the diamond 8 which is folded down flat upon the blank 2, as indicated by $g$ and $h$, and these lengths are a little more than one-half of the width $d$ of the blank 2, which causes the edges of the paper to lap over one another, as shown at 11. This lapping over is done to prevent paste entering the bag, and to produce a smooth inside.

Figure 3:
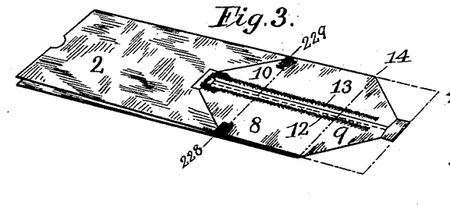
Figure 4:
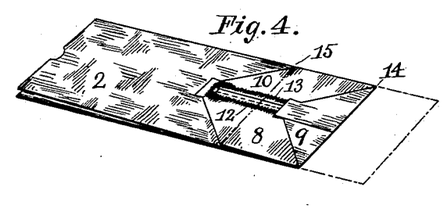
Figure 5:
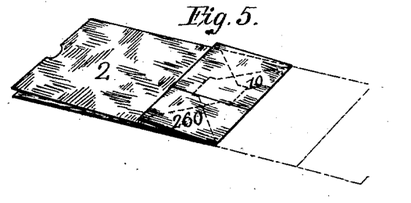
Figure 6:
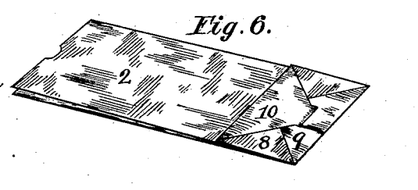
Figure 7:
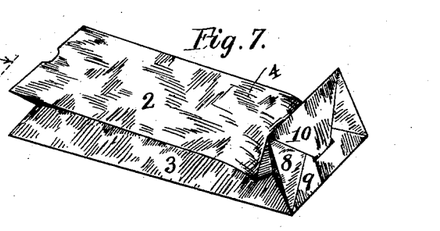
Figs. 7 and 8, on the same sheet, represent the stages of unfolding and opening out the bag to the form shown in perspective in Fig. 8.
Figure 8:
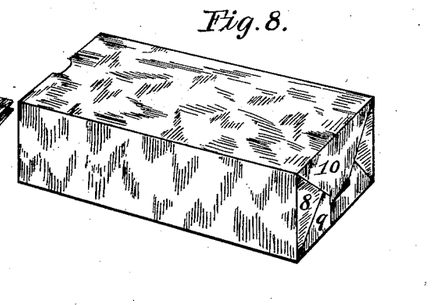

In Fig. 3, Sheet 1, the blank 2 is shown with the diamond 8 folded, and on the diamond are placed two lines of paste, 12 and 13. After this the first flap, 9, is folded at the line 14 back upon the diamond 8, as shown in Fig. 4, Sheet 1. The next operation consists in folding the flap 9, together with the diamond 8 and part of the blank 2 at the line 15, back upon the flap 10, as shown in Fig. 5, Sheet 1. In this position the bottom is passed between rollers and pressed, so that the flaps 9 and 10 will be held down by the paste, when the bottom of the bag is turned over from the position in Fig. 5 to that in Fig. 6, Sheet 1, in which latter position the bag is delivered to the drying mechanism. (Not shown in this application.) The bag is then complete, and is shown partly opened up in Fig. 7, and fully opened up in Fig. 8, Sheet 1.

Having described the bag and the operations of folding, we will now describe the machine.

Figures 9, 10:
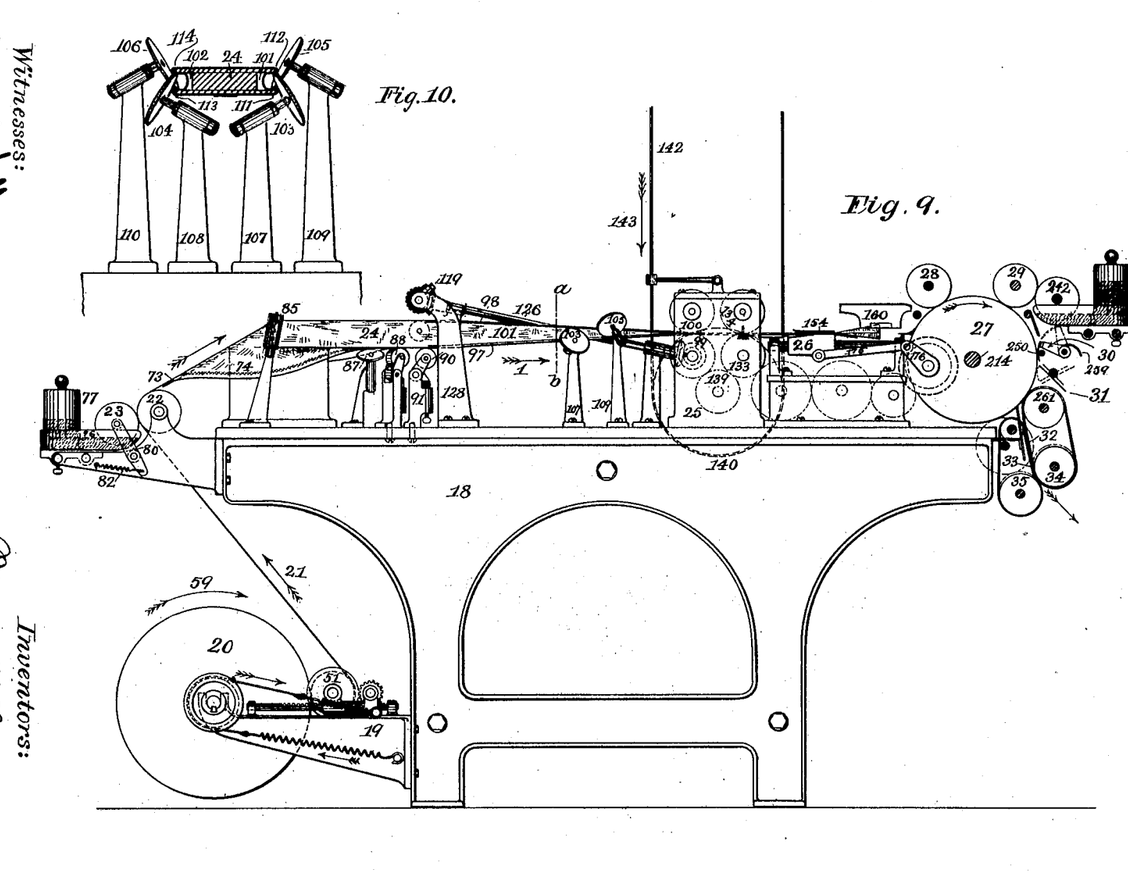
Fig. 9, on Sheet 2, is a side view of the machine in its general aspect, but with a number of details omitted for the sake of clearness.
Fig. 10, Sheet 2, includes a cross-section, looking to the right, on line $a\,b$ of Fig. 9, and also includes a view, looking in the same direction, of the tuck-forming rolls.

Fig. 9, Sheet 2, shows a general side view of the machine, omitting many points of detail for the sake of clearness.

In subsequent figures we show the various portions of the machine in detail, and give complete views of each portion.

In Fig. 9, Sheet 2, 18 represents the frame of the machine, to which are attached various brackets, &c. A bracket, 19, is bolted to the lower part, holding the centralizing device and tension-regulator for the paper roll 20, which is fully described hereinafter. The paper passes from the centralizer in the direction 21, and around a guide-roll, 22, receiving a line of paste at one edge from the paste-roll 23. Then, passing upon the former 24, the paper is folded into a continuous tucked tube, (a length cut from which is shown in Fig. 1, Sheet 1,) by mechanism to be hereinafter fully described. Passing thence between the drawing and cutting rolls in frame-work 25, the tube is severed and delivered to a carriage, 26, driven by crank-motion. While held by the carriage the diamond is folded. (See Fig. 2, Sheet 1.) Then it is delivered to a cylinder, 27, and is pressed flat by a roll, 28. Then the paste is laid upon the diamond by a paste-roll, 29. Then the first flap is folded (see Fig. 4, Sheet 1) by a folder, 30. Then the bag enters a rocking box, 31, which doubles up the bag. (See Fig. 5, Sheet 1.) Then the bag passes between tapes 32 and 33, and is pressed between rolls 34 and 35, after which the bag is passed to a drier. (Not shown.)

We will now proceed to describe the various parts of the machine in detail.

Figures 11, 12, 13, 14:
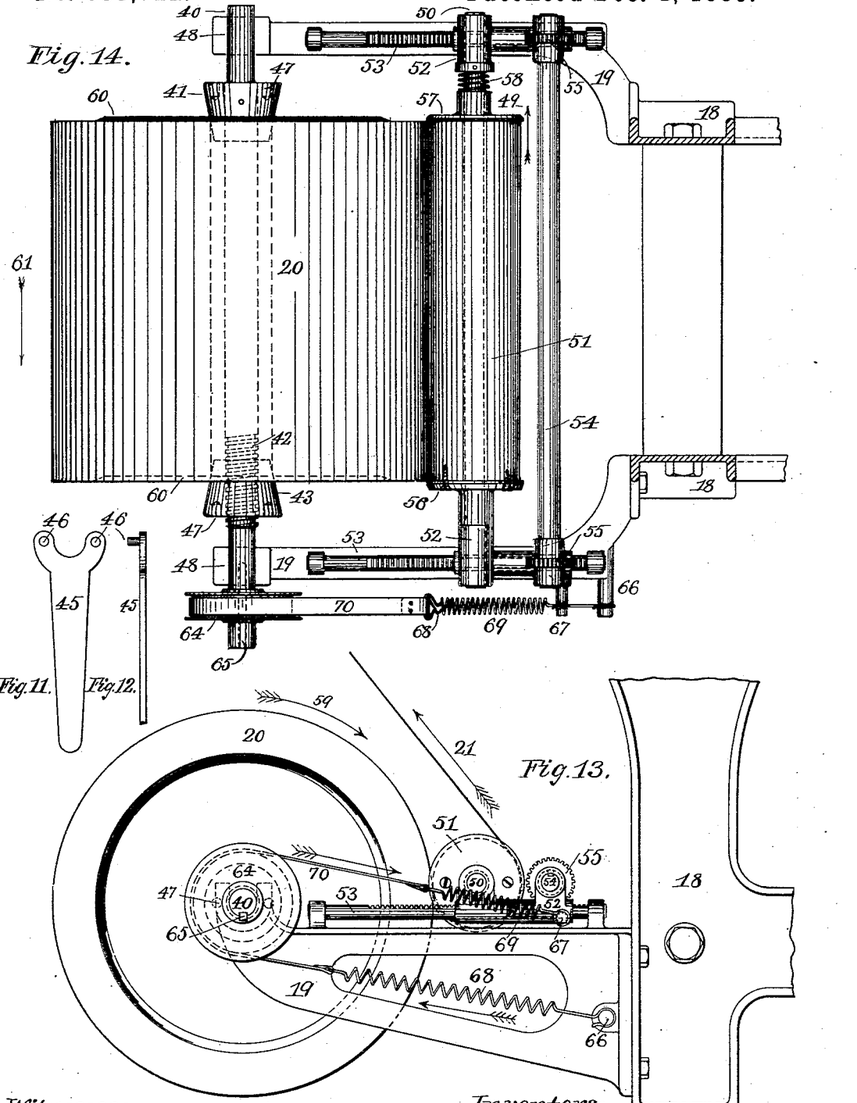
Figs. 11 and 12, Sheet 3, show two views of a spanner-wrench.
Fig. 13, Sheet 3, represents an enlarged view of the centralizing device of the machine.
Fig. 14, Sheet 3, is a plan of the same.

First. *The paper-roll-holding device.*—This consists of a shaft, 40, Figs. 13 and 14, Sheet 3, upon which is pinned a cone, 41, near one end. Near the other end a screw thread, 42, is cut on the shaft, and a second cone, 43, is fitted to this thread. In order to put a roll of paper, 20, on the cones, cone 43 is unscrewed. The shaft 40 is passed through the center of the roll. The cone is replaced and then screwed upon the shaft until the paper roll 20 is held sufficiently tight. This is done by two spanner-wrenches, 45, Figs. 11 and 12, Sheet 3, whose pins 46 46 enter holes 47 47 in the cones 41 and 43. The roll, shaft, and cones are then lifted into journals 48 48 in brackets 19 19.

Second. *The centralizing device.*—This device serves the purpose of guiding the paper from the roll 20, Figs. 13 and 14, Sheet 3, to the tube former centrally, so that the paper shall lap together evenly, and thus avoid all tendency to run off the former. The centralizer consists of a roller, 51, on a shaft, 50, that is supported in bearings in slides 52 52. The latter slide upon rack-shafts 53 53, that are fixed upon brackets 19 19. The roller 51 is free to revolve with the shaft 50, and it can move backward and forward against the roll of paper 20. In order to keep the axis of the roller 51 parallel to that of the shaft 40 at all times, a secondary shaft, 54, is journaled in slides 52 52. Upon that shaft are keyed two pinions, 55 55, that engage with the racks 53 53. This arrangement of racks and pinions keeps the slides 52 52 always opposite one another, and thus holds the roller 51 parallel to the shaft 40. The roller 51 has two flanges, one, 56, being fixed to the roller, and one, 57, being loose on the shaft 50. Against this loose flange 57 a spring, 58, bears. The distance between these flanges 56 and 57 is equal to the width of the roll of paper 20, and the center of this distance is on a line with the longitudinal center of the former and the machine. After placing a roll of paper, 20, in position in the machine, the paper is passed from the roll in arrowed direction 59, around roller 51, between its flanges 56 and 57, and passes in direction 21 up to the former. In practice the rolls of paper are sometimes carelessly handled, and thus get telescoped, as shown at 60 60, or the edges are made uneven in other ways. In operation, as the paper is drawn from the roll 20, the roll of paper becomes smaller in diameter, while the roller 51 and the slides 52 52, &c., move forward, keeping always against the paper roll 20. When the flange 57 arrives at the telescoped portion 60 of the roll 20, the flange is moved gradually in arrowed direction 49 by the greater width of the paper roll at this point, until in a few revolutions of the roll 20 a sufficient amount of paper has been unwound to reduce the roll 20 to its regular width. During this operation the roll 20 is gradually moved sidewise in direction 61, the shaft 40 sliding in its bearings 48 48 as it revolves, thus guiding the roll 20, no matter how irregular its sides may be, always into the centralizing flanged roller 51.

Third: *The tension-regulator.*—This regulator is arranged to vary the tension on the roll of paper 20, Figs. 13 and 14, Sheet 3, according to its diameter. To effect this, we arrange on the shaft 40 a friction-pulley, 64— that is, loosely splined at 65 to the shaft, so as to be removable, and yet revolve positively with the shaft 40 during its motion. Fixed to one bracket 19 is a post, 66, and fixed to one slide 52 is a post, 67. To these two posts respectively are hooked two springs, 68 and 69, and to the other ends of the springs a band, 70, is attached, which passes over the pulley 64. When a roll of paper is placed in the machine, the slides 52 are pushed back, as shown in the drawings, and a sufficient amount of pressure is exerted on the friction-pulley by both springs to give the required holdback to the roll of paper 20; and as the roll diminishes in size less and less tension is exerted by the springs 68 and 69, because of their shortened length. In operation, as the roll of paper revolves in direction 59, the friction-pulley 64 draws the band 70, and lengthens the spring 68 and shortens the spring 69. This has the effect of rewinding any slack paper when the machine stops, for the inertia of the roll 20 will unwind a little of the paper; but as the springs 68 and 69 regain their uniform lengths, the roll 20 is turned backward, or in an opposite direction to arrowed direction 59.

Figures 15, 16, 17, 18:
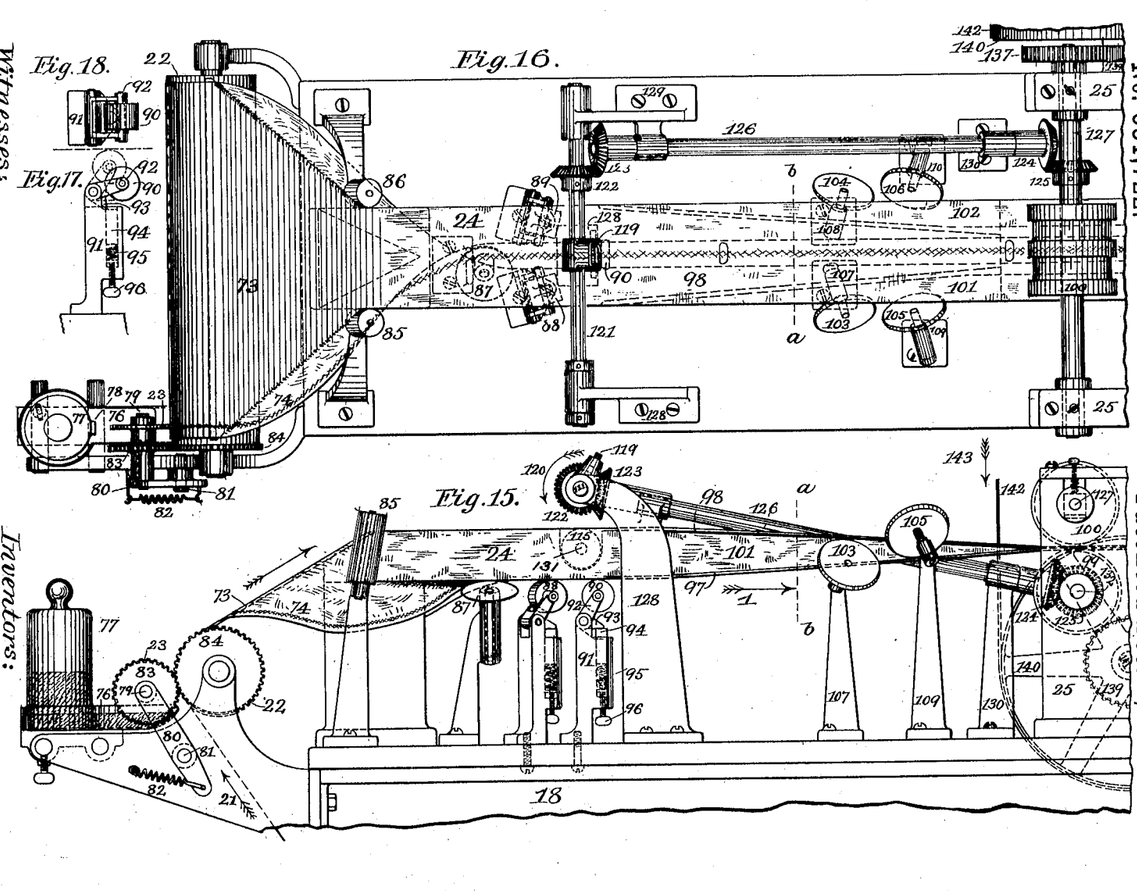
Fig. 15, Sheet 4, represents an enlarged view of the tube-former of the machine.
Fig. 16, same sheet, is a plan of the same.
Figs. 17 and 18, Sheet 4, are detached views of one of the former-rolls.

Fourth. *The apparatus forming a tucked-paper tube.*—We will now describe the formation of the tucked tube from the time the paper leaves the centralizer to the time it is passed between the drawing-rolls. The paper passes from the centralizer upward, in direction 21, Fig. 15, Sheet 4, and is drawn around guide-roll 22 upon the apron 73, and thence upon and around a former, 24. A line of paste, 74, is laid near one edge of the paper by a paste-roll, 23, which is supplied from a dish, 76, which in turn is supplied by a paste-bottle, 77, of glass, that has a vent, 78, which supplies paste to the dish 76 whenever the surface of the paste in the dish is lower than the vent 78. The paste-roll 23 turns upon a stud, 79, which is fixed in a lever, 80, pivoted at 81. The paste-roll 23 is held against the paper on guide-roll 22 by a spring, 82, acting on the opposite end of the lever 80. The paste-roll 23 and guide-roll 22 are geared together by gears 83 and 84, by means of which the paste-roll is driven positively. As the paper passes from the apron 73 to the former 24, it is guided thereon by two corner-rolls, 85 and 86, and the two edges of the paper are led under the former by a tucking-in roll, 87, and two former-rolls, 88 and 89, and the lap is laid together and pressed by the roll 90, all substantially as shown and described in our application for Letters Patent filed July 16, 1883. In putting paper on the former 24 it is desirable to have these rollers out of the way, and this we accomplish by depressing the rollers, so that access may be had between them and the under part of the former 24. In Figs. 17 and 18, respectively, Sheet 4, a side view and plan of one of these brackets, 91, is shown. In this bracket 91 is pivoted a head, 92, having a projection, 93, under which a bolt, 94, is pressed upward by a spring, 95, adjusted by a screw, 96. In the head 92 the roller 90 is free to revolve. When it is desired to depress the roller 90, it is pressed downward until the projection 93 is caught by the corner of the bolt 94, which locks the head 92 in the full line position shown in Fig. 17, Sheet 4, its position in actual operation being shown by the dotted lines. After the paper has been drawn around the former 24, and the lap pasted together by the roller 90, the tube is drawn forward in the direction shown by the arrow 1, and passes upon the converging plates 97 and 98, which flattens the tube until it passes between the drawing-rolls 99 and 100 in frame-work 25. The sides of the tube meanwhile are tucked into recesses 101 and 102 of the former, which is accomplished by means of four beveled rollers, 103 104 105 106, which are set diagonally, so as to lead the paper inwardly. These four rollers are placed on shafts that turn in brackets 107 108 109 110. In Fig. 10, Sheet 2, another view of these rollers may be seen, looking in the direction of the arrow 1 from the line *a b*, Fig. 15, Sheet 4. In it a cross-section of the former 24 is also shown, and the recesses 101 and 102, and the rollers 103 to 106 are shown in position. In operation these rollers keep the paper stretched over the four corners 111 112 113 114, thus directing the tucks of the tube inwardly, and as the tube is drawn forward by the drawing-rolls 99 and 100, Figs. 15 and 16, Sheet 4, the tube is flattened more and more, until it assumes the tucked-tube shape shown in Fig. 1, Sheet 1. While making the tube on the former 24, a hole is cut through the upper wall of the tube. This hole 118, Fig. 21, Sheet 6, is cut by means of a knife, 119, Figs. 15 and 16, Sheet 4, of suitable shape, carried in direction 120 by the shaft 121, which shaft derives rotary motion by a train of four bevel-gears, 122 123 124 125, on shafts 121, 126, and 132, which are supported by brackets 128 129 130 and frame-work 25. The shaft 132 derives its motion in a manner to be hereinafter explained. In the former 24 is placed a rubber roller, 115, which is free to revolve on its shaft 131. As the paper tube passes over this roller 115, the notch-knife 119 revolves in direction 120, and cuts a hole in the tube at each revolution, which defines the length of the blank for the bag.

Figure 19:
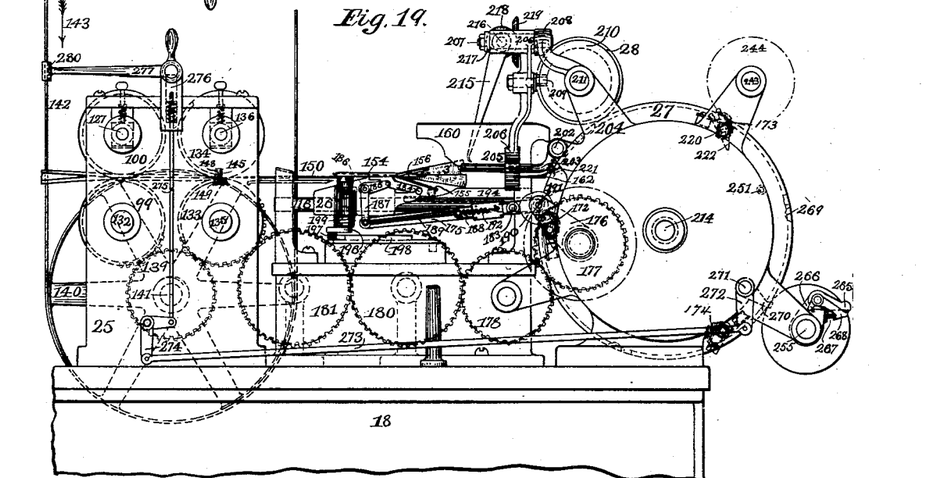
Fig. 19, Sheet 5, represents a side view of the drawing and cutting rolls, carriage, and stop-motion, upon an enlarged scale.
Figure 20:
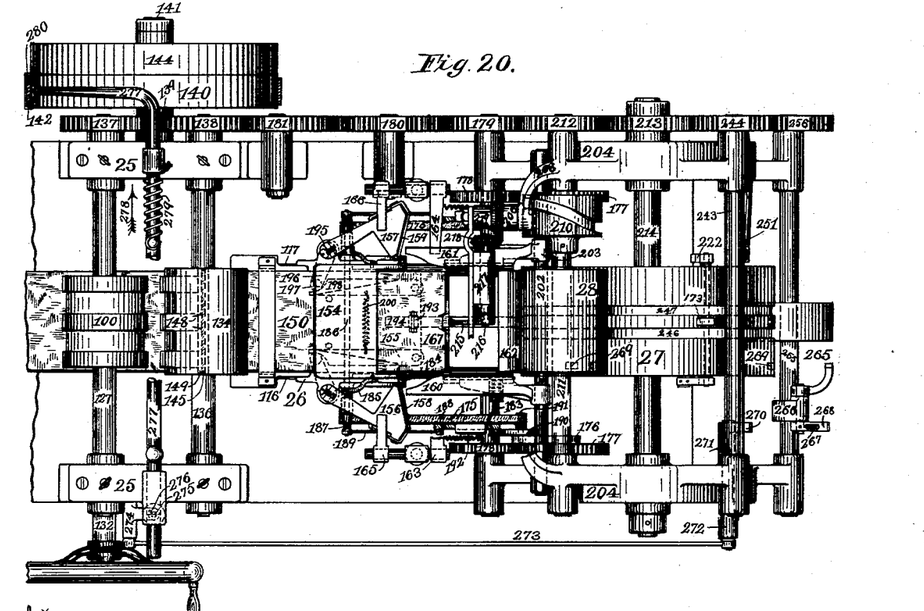
Fig. 20, Sheet 5, is a plan of the same.

Fifth. *The apparatus to fold the bottom diamond.*—After the tucked tube is formed and drawn along by the drawing-rolls 99 and 100 on shafts 132 and 127, Figs. 19 and 20, Sheet 5, it is passed to the cutting-rolls 133 and 134 on shafts 135 and 136, the first two being geared together by two gears meshing into one another, and shown only in the plan, Fig. 20, Sheet 5, at 137, while the cutting-roll gears are shown at 138 in like manner, being omitted in Fig. 19, to show the rolls themselves more clearly. The lower drawing-roll, 99, and the lower cutting-roll, 133, are connected by an intermediate gear, 139. To this intermediate gear is fastened a driving-pulley, 140, on the stud 141. The pulley is driven by a belt, 142, moving in direction 143. A loose pulley, 144, is placed adjoining the driving-pulley, upon which the belt is shifted to stop the machine.

Figures 21, 24, 25, 28, 29:
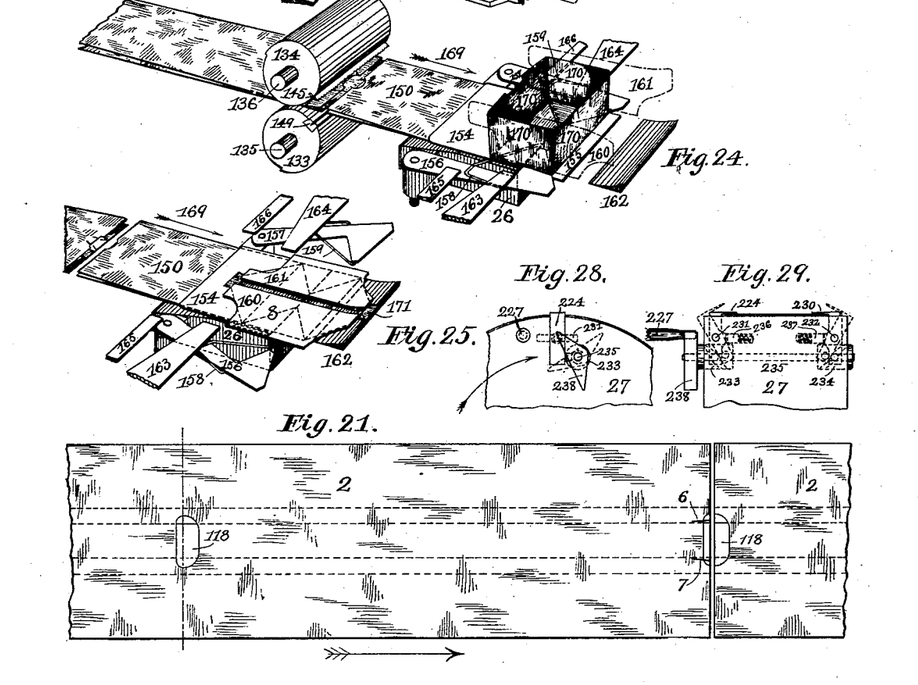
Fig. 21, Sheet 6, is a plan of the paper tube, showing the severing, notching, and slitting of the tube.
Figs. 22, 23, 24, and 25, Sheet 6, show perspective views of the first steps in folding the bottom of the bag, which bottom we call the "diamond.
Fig. 28, Sheet 6, shows an enlarged view, being a side view, of the side grippers on the cylinder.
Fig. 29, same sheet, shows a front view of the same.

As the tucked tube passes between the cutting-rolls 133 and 134, a severing-knife, 145, cuts the tube into blanks at each revolution, the cut being made across the hole 118, as shown in Fig. 21, Sheet 6, and two slits, 6 and 7, are made at the same time by a slitter-knife, 148, Figs. 19 and 20, Sheet 5, adjoining the severing-knife 145, both of which cut into the rubber pad 149 in roll 133. The severing of the tube is effected at the same time that the blank 150 is delivered to the carriage 26. Upon this carriage the first operations of folding the bottom are performed, namely, the folding of the diamond 8, Fig. 2, Sheet 1, and in order to explain the method of folding it, we have represented the operations in four perspective views in Figs. 22, 23, 24, and 25, Sheet 6, wherein only the necessary parts are shown, to avoid confusion. Here the tucked tube passes between the cutting-rolls 133 and 134, Figs. 22, 23, and 24, Sheet 6. The carriage 26 slides forward and backward on ways 116 and 117, Figs. 19 and 20, Sheet 5, and contains, first, a presser-plate, 154, Figs. 22 to 25, Sheet 6, having a motion downward on carriage 26; and, secondly, a lifting-plate, 155, having a swinging motion upward; and, thirdly, a pair of tuck-arms, 156 and 157, with triangular ends, on which are pivoted a pair of triangular-shaped tuck-wires, 158 and 159. These tuck arms and wires have a swinging motion inwardly toward the paper tube. The carriage 26 travels between two side-folder plates, 160 and 161, Figs 23, 24, and 25, that can swing downward upon the carriage 26 while it is in its forward position. A curved plate, 162, Figs. 24 and 25, is placed in front of the carriage 26 and near the cylinder 27, Fig. 19, Sheet 5; and four turning-fingers, 163 and 164, 165 and 166, Figs. 22, 23, 24, and 25, Sheet 6, are fixed adjacent to the sides of the carriage 26.

The operations of making the diamond will now be described.

Figures 22, 23:
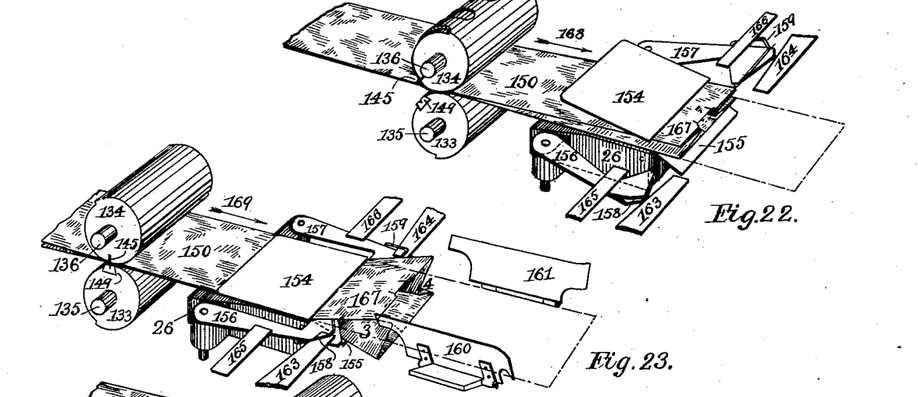

The blank 150, Fig. 22, Sheet 6, is entered between the carriage 26 and presser-plate 154, as shown at 167, and while they travel forward in direction 168 the presser-plate 154 drops upon the blank and holds it firmly to the carriage 26, Fig. 23, Sheet 6, and at the same time the severing-knife 145 cuts off the blank 150, allowing the carriage to carry it off. As soon as the presser-plate 154 has gripped the blank 150, the front part, 167, thereof springs open sufficiently to allow the triangular ends of the tuck-levers 156 and 157, with the wires 158 and 159, to swing into the tucks 3 and 4, as seen in Fig. 23, Sheet 6. The wires 158 and 159 then arrive in front of the turning-fingers 163 and 164, and as the carriage travels forward in direction 169 these wires are turned over on their pivots, assuming the position shown in Fig. 24, Sheet 6, causing the front end of the bag-blank to assume the box shape 170. The lifting-plate 155 is raised at the same time level with the surface of the carriage, as seen in Fig. 24. The carriage then travels farther along, and when it arrives between the two side-folder plates 160 and 161, which are shown in dotted lines in Fig. 24, these plates are swung downward, which flattens the box 170 into the diamond 8, as seen in Fig. 25, Sheet 6, and the pressure of the presser-plate 154 is released at the same time. The front end, 171, of the diamond is thus laid upon the curved plate 162, from which it passes to the cylinder 27, Figs. 19 and 20, Sheet 5, being gripped by one of three grippers, 172 173 174, in the cylinder 27, each time a diamond is folded, which draws the bag-blank from the carriage 26 and from under the side-folder plates 160 and 161, which remain down for a short while. Referring again to Fig. 25, Sheet 6, just before the diamond-folded blank is drawn away from the carriage 26, the tuck-arms 156 and 157 spring outward, as shown in Fig. 25, thus releasing the blank 150 entirely, which passes on, as just described. The carriage 26 now slides backward, and during the return stroke the presser-plate 154 is elevated to allow the next blank to enter. The lifting-plate 155 is dropped, to allow the front part, 167, of the blank 150 to spring open when pressed by the presser-plate 154, and the tuck-wires 158 and 159 are swung over by striking the two fixed turning-fingers 165 and 166, Fig. 22, Sheet 6, thus preparing them to enter the tucks for forming another box 170.

We will now describe the method of causing the foregoing motions, and refer to Figs. 19 and 20, Sheet 5.

The carriage 26 is driven by a pair of connecting-rods, 175 175, and cranks 176 176, and gears 177 177, which derive rotary motion by a train of intermediate gears, 178 178, 179, 180, and 181, the last one meshing into the lower cutting-roll gear, 138. The carriage 26 thus receives by the crank-stroke a variable motion having a stroke of about one-half the length of the bag. Near the beginning and near the end of the crank-stroke there are two moments when the speed of the carriage 26 in going forward is uniform with the speed of the paper passing through the cutting-rolls 133 and 134, and it is at these moments of uniform speed, first, that the blank 150 is severed and delivered to the carriage; and, secondly, that the diamond-folded blank is delivered from the carriage 26 to the cylinder 27. By this arrangement of a crank-stroke the reciprocating motion of the carriage is rendered easy and made capable of a high speed, as the carriage 26 starts and stops gradually at the beginning and end of its stroke. During the carriage-motion the presser-plate 154 drops and grips the blank 150, then stays down until the diamond is folded, then is released to allow the blank to be drawn away, then on the return-stroke of the carriage it is elevated to allow another blank to enter. These motions are accomplished by the following devices, that are arranged on both sides of the carriage; but we will describe and refer to those on one side only, as the two sets of devices are duplicates:

To the presser-plate 154, which is pivoted on ears on the carriage 184, a lever, 185, is connected, which lever is fixed to a shaft, 186. From this shaft 186 another lever, 187, projects downward, and its end is positioned opposite to the pin of the connecting-rod 175. The lever 187 is connected to a slide, 188, on the connecting-rod 175 by a rod, 189. A roller, 183, on the slide 188, abuts against a cam, 190, fixed to the crank-pin 191, and is held against the cam by a spring, 192. This cam 190 is shaped so as to operate on the slide 188 and along to the presser-plate 154 as the crank 176 revolves, giving to the presser-plate the requisite motion at the proper times.

The next motion is that of the lifting-plate 155, which, as before mentioned, is elevated a little after the presser-plate has been dropped on the carriage. This plate 155 is lifted by a roller, 193, running on a track, 194, under the carriage.

The next motion is the tuck-arm motion. These arms 156 and 157 operate to form the box 170, as before described, and by referring to one side only it will be seen that arm 157 is pivoted on an upright shaft, 195, to which an arm, 196, is fixed. A roller, 197, at the end of the arm 196, abuts against a switch-cam, 198, when the carriage 26 goes forward, and on the return-stroke the tuck-arm is swung outward by a coiled spring, 199, and the switch-cam 198 swings out of the way of the roller 197, and the switch-cam 198 is returned to place by a spring, 200.

The next motion to describe is the side-folder motion, which flattens the box 170 into the diamond-shape. The side-folder plates 160 and 161 are both shown in Figs. 19 and 20, Sheet 5; but we have shown the operating mechanism only on one side in Fig. 20, but complete in Fig. 19, both sides being similar. The side-folder plate 161 is hinged in a bracket, 203, on a cross-bar, 202. To the plate is secured a sector, 205, into which meshes a sector ended lever, 206, vibrating on a stud, 207, in bracket 208 on frame-work 204. To the segment 206 a roller, 209, is attached, which is operated by a cam, 210, on shaft 211. This shaft is driven continuously by a gear, 212, meshing into a spur, 213, (shown only in Fig. 20,) on shaft 214, upon which cylinder 27 is secured. The cam 210 is so timed that it will drive the sector-ended lever 206 and sector 205 and plate 161 at the proper times, as before described.

The next motion is one which is used to assist in delivering the diamond to the cylinder 27. It consists of a vibrating finger, 215, on a shaft, 216, in a bracket, 217. The bevel-pinion 218 on shaft 216 meshes into a bevel-gear, 219, on the hub of the sector-ended lever 206, from which the finger 215 derives its swinging motion to and from the cylinder 27. The point of the finger 215 enters the box 170 while it is being formed and assists in pushing the front end of the diamond downward toward the cylinder 27, so that the point 171, Fig. 25, Sheet 6, of the diamond 8 can be seized by one of three grippers, 172, 173, 174, Figs. 19 and 20, Sheet 5, in the cylinder 27. These grippers are rocked on shafts 220 in the cylinder 27, and are tipped over at the proper moment by a stud, 221, in frame-work 204, striking dogs 222 on the shafts 220, so that the grippers will seize the bag-blanks and carry them upon the cylinder 27 in succession. This gripper-motion, in combination with a cylinder, is similar to those used upon printing-presses, and therefore requires no detailed description here. As the bag-blanks pass under the presser-roll 28, the diamond is flattened upon the cylinder 27, and three pairs of side-grippers, 224, 225, and 226, Fig. 26, Sheet 7, are rocked upon the bag by a stud, 227, in frame-work 204. These grippers seize the bag at the points 228 and 229, Fig. 3, Sheet 1.

By referring to Figs. 28 and 29, Sheet 6, the side-gripper motion will be more readily understood. Here the grippers 224 and 230, being shown enlarged, are pivoted on pins 231 and 232, and below these there are two pins engaging in spiral slots in cams 233 and 234 on shaft 235 in cylinder 27. Presser-plugs 236 and 237 press by means of springs against the grippers 224 and 230, keeping them placed open or closed, as shown in the drawings in dotted and in full lines. A dog, 238, on shaft 235 is struck by the stud 227, to close the grippers on the bag.

Figure 26:
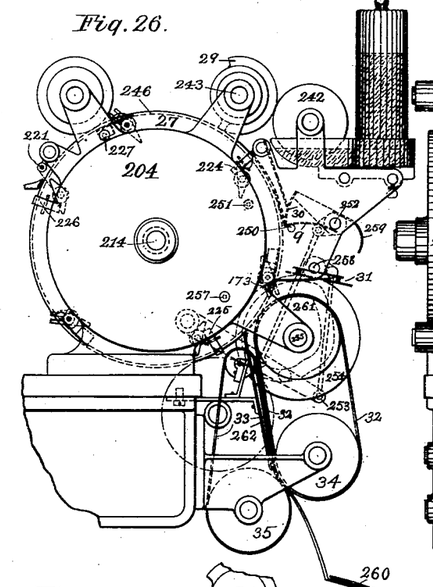
" Fig. 26, Sheet 7, represents a side view of the cylinder, paster arrangements, flap-folding motions, and delivery.
Figure 27:
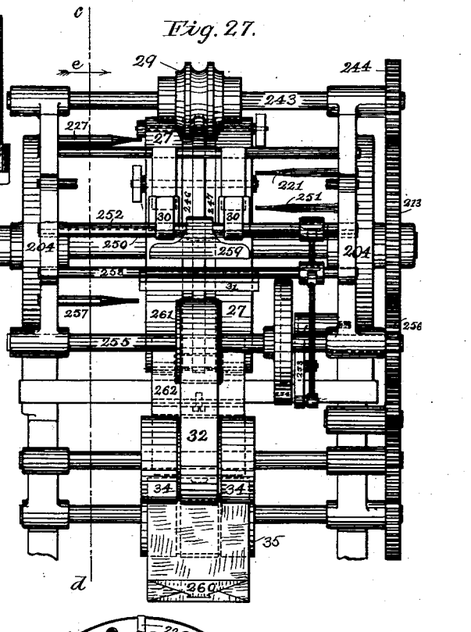
Fig. 27, same sheet, shows a front view of the same.

Going back to Figs. 26 and 27, Sheet 7, and having gripped the diamond by a center-gripper and a pair of side-grippers on the cylinder 27, we will now proceed to describe the next improvement.

Sixth. *The apparatus which enables paste to be applied to the diamond without danger of pasting the machine during the absence of bags in the machine.*—We accomplish this by recessing the cylinder 27, Figs. 26 and 27, Sheet 7, underneath the paste-roll 29. This roll consists of a portion of a circle, the periphery of which resembles a letter U, and it receives its paste from a distributer-roll, 242, Fig. 26 only, that takes paste from a reservoir similar to that hereinbefore described. The roll 29 is driven by a shaft, 243, and gear 244, meshing into spur-gear 213, both of which are shown only in Fig. 27. The lines of paste deposited by the roll 29 are shown at 12 and 13 in Fig. 3, Sheet 1. Around the cylinder 27, Figs. 26 and 27, Sheet 7, we cut two recesses or grooves, 246 and 247, that are a little wider than the paste-roll lines, and are immediately beneath them, and the cylinder is also recessed beneath that part where the curve of the U matches. If a bag is absent, the paste on the paste-roll 29 cannot touch the cylinder 27; but when a bag is present the paste will be applied as indicated.

Figure 30:
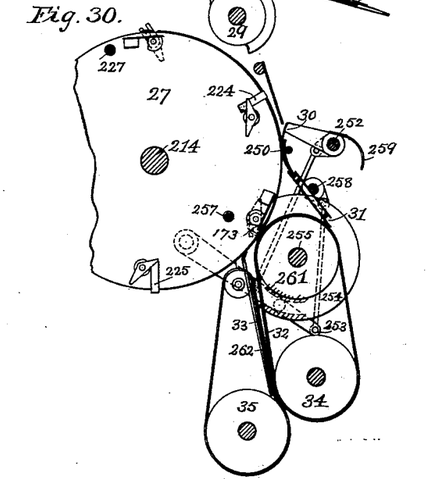
Figs. 30 and 31, Sheet 7, show sectional views of the flap-folding motions, with the cylinder and the delivery made on the line $c\,d$, Fig. 27, Sheet 7, looking in the direction of the arrow $e$.
Figure 31:
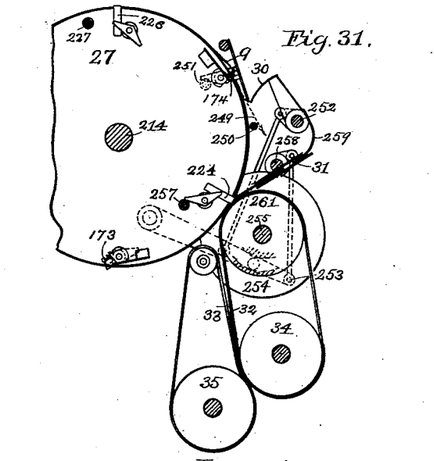
Figure 32:
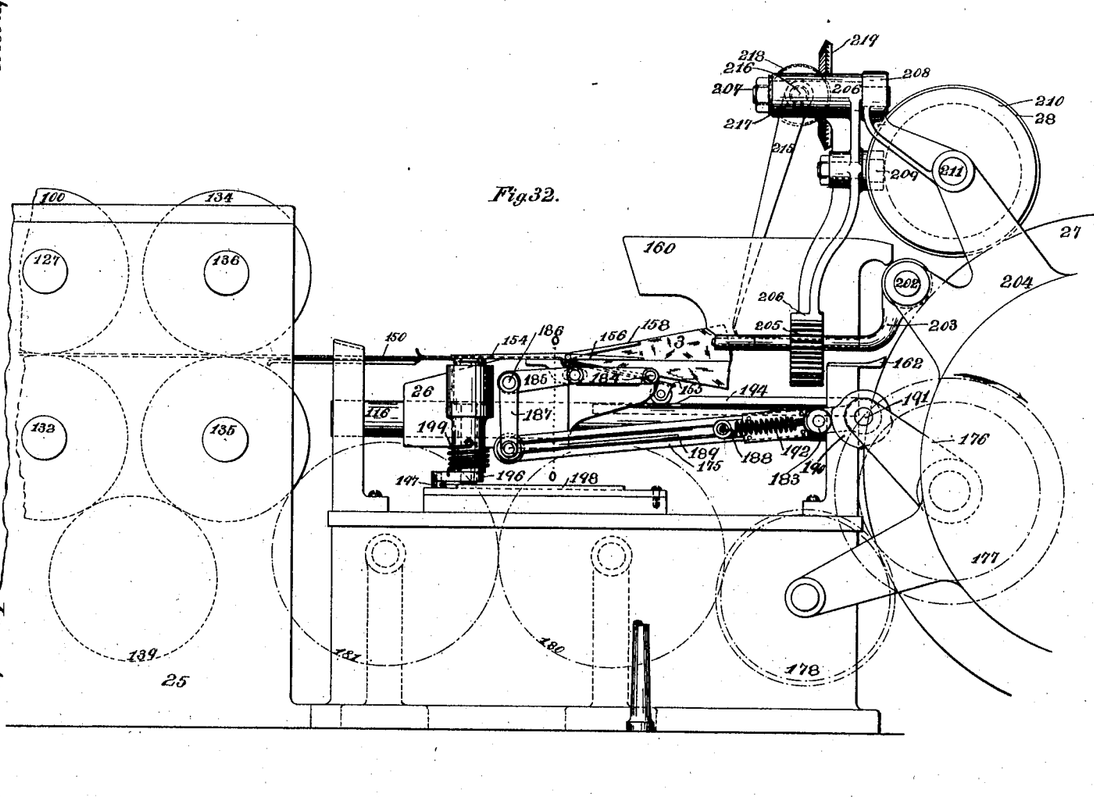
Fig. 32 is an enlarged view of part of Fig. 19.
Figure 33:
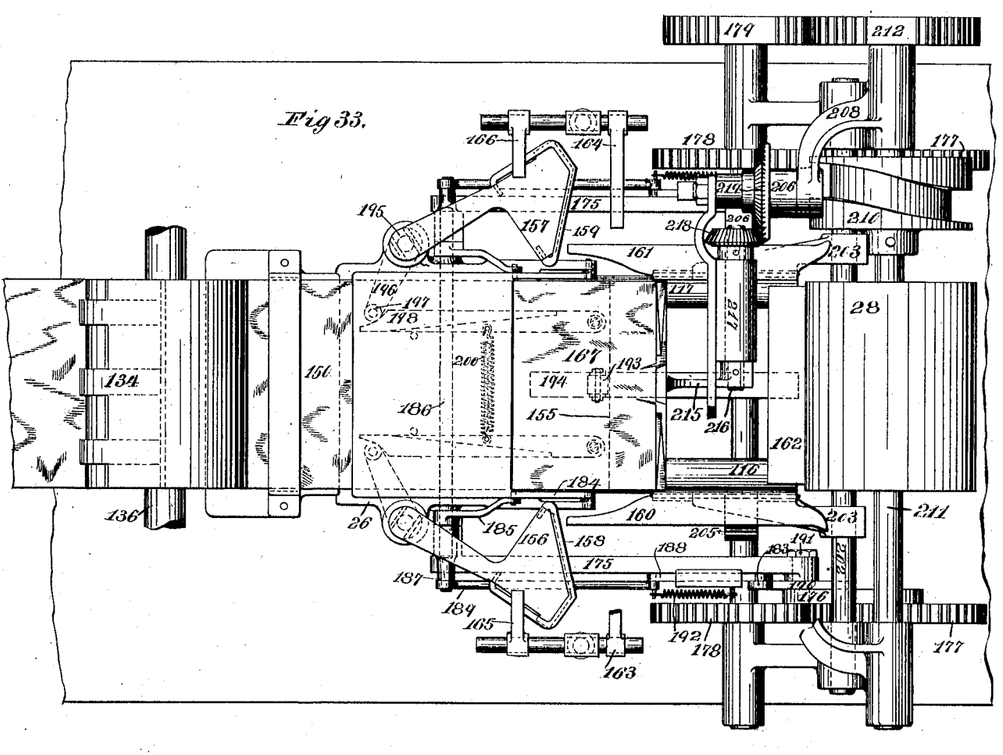
Fig. 33 is a plan of the same.
Figure 34:
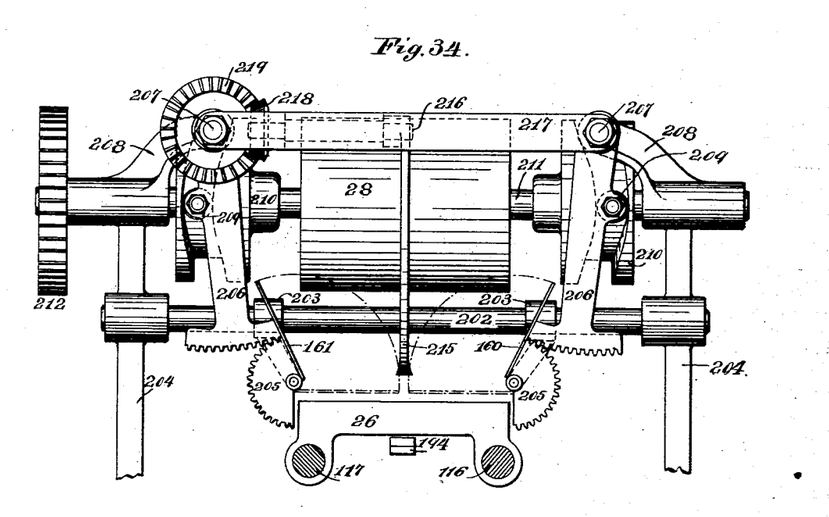
Fig. 34 is a view of the side-folder motion, looking to the right from the dotted line $o\,o$ in Fig. 32.
Figure 35:
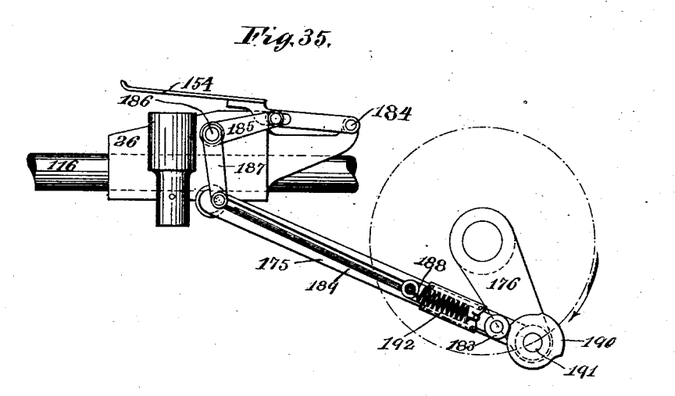
Fig. 35 is a side view of the presser-plate motion.

Seventh. *The apparatus to fold the flaps of the bag.*—Referring to Figs. 26 and 27, Sheet 7, after the paste-roll 29 has applied paste to the diamond, its front end or flap, 9, (see Fig. 4, Sheet 1,) is released by a stud, 251, tripping over the gripper 174, Fig. 31, Sheet 7. The flap 9 then rises from the cylinder 27, and, going in arrowed direction 249, passes over the bar 250, Figs. 26, 27, 30, and 31, Sheet 7, and it is doubled or folded over by a folder-blade, 30, on rock-shaft 252, worked by an arm and rod from operating-lever 253. This last derives a vibratory motion at proper intervals from cam 254 on shaft 255, and the latter is driven by a gear, 256, meshing into spur 213. (Shown only in Fig. 27.) When the folder-blade 30 has completed its motion, a rocking box, 31, on rock-shaft 258 presents one open side to the folded bag, as seen in Fig. 30, Sheet 7. The bag is now held to the cylinder 27 by the side-grippers 224 only and these push the bag into the box 31, which then rocks over into the position shown in Fig. 31. The box-shaft 258 is rocked by an arm and rod from the same operating-lever 253 and cam 254 that drive the flap-folder blade 30. The operating-lever 253 therefore vibrates the folder-blade 30 and the rocking box 31 alternately to and from one another, as shown in Figs. 30 and 31, Sheet 7, respectively. When rocked together, as in Fig. 31, a pinching-blade, 259, on shaft 252 enters the outer open side of the rocking box 31, and pinches or presses the flap at the folding-line 14, Fig. 4, Sheet 1. When the working-box 31, Fig. 31, Sheet 7, assumes the position shown, the folded bottom of the bag is withdrawn from the box 31 by the side-grippers 224 and the bottom 260, Fig. 5. Sheet 1, is thus doubled over upon the body 2 of the bag, and upon the second flap, 10. In this condition the bag passes beneath the tape-roller 261, Figs. 26, 27, 30, and 31, Sheet 7, and is deflected from the cylinder 27 by a plate, 262. The side-grippers 224 (see Fig. 31) are meanwhile rocked open by a stud, 257, to release the bag, which then passes between tapes 32 and 33, and it is pressed between rollers 34 and 35 sufficiently to make the flaps 9 and 10, Fig. 6, Sheet 1, adhere, in which condition the bag is delivered from the rollers 34 and 35, Figs. 26 and 27, Sheet 7, as the bottom 260 of the bag springs open, as shown, ready to proceed to a drying apparatus. (Not shown in this application.)

The next motion we will describe is:

Eighth. *The automatic stop-motion.*—This motion consists of a feeler, 265, Figs. 19 and 20, Sheet 5, held on an arm, 266, on shaft 255. A spring, 267, bearing against a hook, 268, keeps the feeler 265 pressed outward together with the hook 268 on the arm 266. When the feeler 265 revolves, it feels whatever bags may be held by the cylinder 27, and the spring 267 is compressed and the hook 268 is sprung inward. If, however, there is no bag on the cylinder 27, the point of the feeler 265 drops into a recess, 269, in the cylinder 27, and the hook 268 makes a larger sweep in its revolution, and in such event it comes in contact with a dog, 270, secured to a shaft, 271, in frame-work 204, and swings the dog 270 aside. This motion is communicated to an arm, 272, on shaft 271, and so on through a rod, 273, bell-crank 274, rod 275, and catch 276, which catch is depressed. This allows a shipper-rod, 277, in frame-work 25, to be sprung in direction 278 by means of a spring, 279. A head, 280, on the shipper rod 277, through which the belt 142 passes, guides it from the driving-pulley 140 to the loose pulley 144, thus stopping the machine.

We claim as our invention—

1. The combination of the roller 51, the two slides 52, the two racks 53, the shaft 54, and the two pinions 55, substantially as described.

2. The combination of the former 24, having the tuck-recesses 101 and 102, with the beveled rollers 103, 104, 105, and 106, substantially as described.

3. The combination of the roller 90, the head 92, the bolt 94, and the spring 95, substantially as described.

4. The combination of the carriage 26, operated by the connecting-rod 175, the crank 176, and the gear 177, with the presser-plate 154, operated by the connecting-rod 189, the cam 190, and the spring 192, substantially as described.

5. The combination of the carriage 26, the switch-cams 198, the springs 199, and the tuck-arms 156 and 157, substantially as described.

6. The combination of the crank 176, provided with the cam 190, rigidly fixed thereto by the crank-pin 191, with the connecting-rod 175, the connecting-rod 189, and the spring 192, all constructed and adjusted in such a way, substantially as described, as that the connecting-rod 189 has an auxiliary reciprocating motion in the same line as the general reciprocating motion of the two connecting-rods, all substantially as described.

7. The combination of the finger 215 and the shaft 216, both rocking substantially as described, with the carriage 26, reciprocating substantially as described, all operating to deliver the front end, 171, of the diamond to one of the grippers of the cylinder 27, substantially as described.

8. The combination of the pincher 259 and the box 31, both operating together to flatten the fold at the line 14, substantially as described.

9. The combination of the cylinder 28, the feeler 265, the hook 268, the spring 267, and the arm 270, all operating together in such a way as that when the point of the feeler enters one of the recesses 269 the said mechanism will stop the machine by shifting the belt to the loose pulley 144, through intermediate mechanism, substantially as described.

WILLIAM A. LORENZ.
WILLIAM H. HONISS.

Witnesses:
ALBERT H. WALKER,
MORGAN W. BEACH.